US012133079B2

(12) United States Patent
Bandi et al.

(10) Patent No.: US 12,133,079 B2
(45) Date of Patent: Oct. 29, 2024

(54) PRE-SECURITY MESSAGE VERIFICATION

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Ivan Vukovic, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 223 days.

(21) Appl. No.: 17/936,981

(22) Filed: Sep. 30, 2022

(65) Prior Publication Data
US 2024/0114341 A1    Apr. 4, 2024

(51) Int. Cl.
*H04W 12/106* (2021.01)
*G06Q 50/40* (2024.01)
*H04W 4/44* (2018.01)
*H04W 12/63* (2021.01)

(52) U.S. Cl.
CPC .......... *H04W 12/106* (2021.01); *G06Q 50/40* (2024.01); *H04W 4/44* (2018.02); *H04W 12/63* (2021.01)

(58) Field of Classification Search
CPC ..... H04W 12/106; H04W 4/44; H04W 12/63; G06Q 50/40
See application file for complete search history.

(56) References Cited

U.S. PATENT DOCUMENTS

| | | | |
|---|---|---|---|
| 9,559,804 B2 | 1/2017 | Ibrahim et al. | |
| 11,120,688 B2 | 9/2021 | Wray et al. | |
| 11,955,005 B2* | 4/2024 | Nguyen | G08G 1/09623 |
| 2016/0169688 A1* | 6/2016 | Kweon | G08G 1/096741 |
| | | | 701/522 |
| 2020/0037131 A1* | 1/2020 | Hieu Nguyen | H04W 16/28 |
| 2020/0294401 A1* | 9/2020 | Kerecsen | G08G 1/205 |
| 2020/0342760 A1 | 10/2020 | Vassilovski et al. | |
| 2022/0345860 A1* | 10/2022 | Oh | H04W 4/021 |
| 2022/0408214 A1* | 12/2022 | Song | H04W 4/12 |
| 2022/0408219 A1* | 12/2022 | Kong | H04W 4/50 |

(Continued)

OTHER PUBLICATIONS

Connecting Pedestrians with Disabilities to Adaptive Signal Control for Safe Intersection Crossing and Enhanced Mobility, System Design Document (SDD), U.S. Department of Transportation, Pub. No. FHWA-JPO-19-752, Jun. 2019.

(Continued)

*Primary Examiner* — Michael Won
(74) *Attorney, Agent, or Firm* — Joseph Zane; Brooks Kushman P.C.

(57) ABSTRACT

Performing filtering of infrastructure-to-vehicle (V2I) messages by a vehicle is provided. First messages are received from one or more road-side units (RSUs). Responsive to the vehicle approaching a check-in location indicated by the first messages, a check-in location identifier is stored for the check-in location retrieved from the first messages as being a current check-in location for the vehicle. Second messages are received from the one or more RSUs. Responsive to a message identifier in the second messages matching the check-in location identifier, the second messages are forwarded to a vehicle application for processing. Otherwise the second messages are discarded.

11 Claims, 13 Drawing Sheets

(56) References Cited

U.S. PATENT DOCUMENTS

| | | | |
|---|---|---|---|
| 2023/0141992 A1* | 5/2023 | Jeong | H04L 9/3268 |
| | | | 713/156 |
| 2024/0114341 A1* | 4/2024 | Bandi | G06Q 50/40 |

OTHER PUBLICATIONS

Zeng et al., Potential Connected Vehicle Applications to Enhance Mobility, Safety, and Environmental Security, Texas Transportation Institute, The Texas A&M University System, Report No. SWUTC/ 12/161103-01, Feb. 2012.

* cited by examiner

PRE-SECURITY MESSAGE VERIFICATION

TECHNICAL FIELD

Aspects of the disclosure generally relate to the filtering of infrastructure-to-vehicle (I2V) messages in advance of security verification or other processing of the messages.

BACKGROUND

Vehicle-to-everything (V2X) is a type of communication that allows vehicles to communicate with various aspects of the traffic environment. This communication may include interaction with vehicles using vehicle-to-vehicle (V2V) communication and interaction with infrastructure using vehicle-to-infrastructure (V2I) communication.

Vehicles may include radio transceivers and vehicle on-board units (OBUs) to facilitate the V2X communication. Road-side units (RSUs) may provide wireless communications from roadside infrastructure to the OBUs. Such communication may be referred to as I2V communication. RSUs generally operate in the same frequency band as V2X, over technologies such as Cellular Vehicle-to-Everything (CV2X) and Dedicated Short Range Communications (DSRC) technologies. Some RSUs provide additional functionality, such as local Wi-Fi hotspots for pedestrians or cellular backhaul to communicate information with a central system.

SUMMARY

In one or more illustrative examples, a vehicle for performing filtering of I2V messages is provided. The vehicle includes a transceiver and an OBU. The OBU is programmed to receive first messages from one or more RSUs, responsive to the vehicle approaching a check-in location indicated by the first messages, verify which all messages relevant for the vehicle through algorithm processing at security layer before doing the security verification/decryption and vehicle application for further processing, store a check-in location identifier for the check-in location retrieved from the first messages as being a current check-in location for the vehicle, receive second messages from the one or more RSUs, responsive to a message identifier in the second messages matching the check-in location identifier, through check-in location identifier of first message matches to check-out location of first message and check-out location of first message matches to last-node/check-in location of second messages via verifying all messages relevant for the vehicle through algorithm processing at security layer before doing the security verification/decryption and vehicle application for further processing, and otherwise discard the second messages.

In one or more illustrative examples, a method for performing filtering of I2V messages by a vehicle is provided. First messages are received from one or more RSUs. Responsive to the vehicle approaching a check-in location indicated by the first messages, a check-in location identifier is stored for the check-in location retrieved from the first messages as being a current check-in location for the vehicle. Second messages are received from the one or more RSUs. Responsive to a message identifier in the second messages matching the check-in location identifier, the second messages are forwarded to a vehicle application for processing. Otherwise the second messages are discarded.

In one or more illustrative examples, a non-transitory computer-readable medium comprising instructions for performing filtering of I2V messages that, when executed by an OBU of a vehicle, cause the OBU to perform operations including to receive first messages from one or more RSUs; verify the first messages are valid before utilizing a check-in location indicated by the first messages; responsive to the vehicle approaching the check-in location indicated by the first messages, store a check-in location identifier for the check-in location retrieved from the first messages as being a current check-in location for the vehicle; responsive to the vehicle exiting a check-out location indicated by the first messages, removing the check-in location identifier from storage to reset the current check-in location; forward the first messages matching the current check-in location to a vehicle application for processing; receive second messages from the one or more RSUs; verify the second messages are valid before forwarding the second messages to the vehicle application; responsive to a message identifier in the second messages matching the check-in location identifier, forward the second messages to the vehicle application for processing; and otherwise discard the second messages.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

As the V2X space grows, not only in the connectivity area but also for the autonomous and electric vehicles, message traffic may increase to support various application. These messages are generally verified to ensure authenticity. However, it may be computationally complex to verify each and every message. Moreover, such verification may affect time-sensitive operations due to the processing of messages that are irrelevant to the location of the vehicle or otherwise not of interest. It may also be unnecessary to perform verification for every message from a sender, e.g., every 100 milliseconds. Message filtering by utilizing high-definition static maps in combination with complex vehicle localization may be impractical. Additionally, the effect on the transmission side of the messages for signing each message may be burdensome as well.

An approach to vehicle messaging may include filtering of V2I messages in advance of security verification or other processing of the messages. This may address the computational overhead, time sensitivity, and filtering aspects of the increase in message traffic, and may support in reduction of verification complexity such that those resources may be allocated elsewhere. This processing may be useful for intersection management as well as tolling situations, as some non-limiting examples. Further aspects of the disclosure are discussed in detail herein.

Figure 1A:
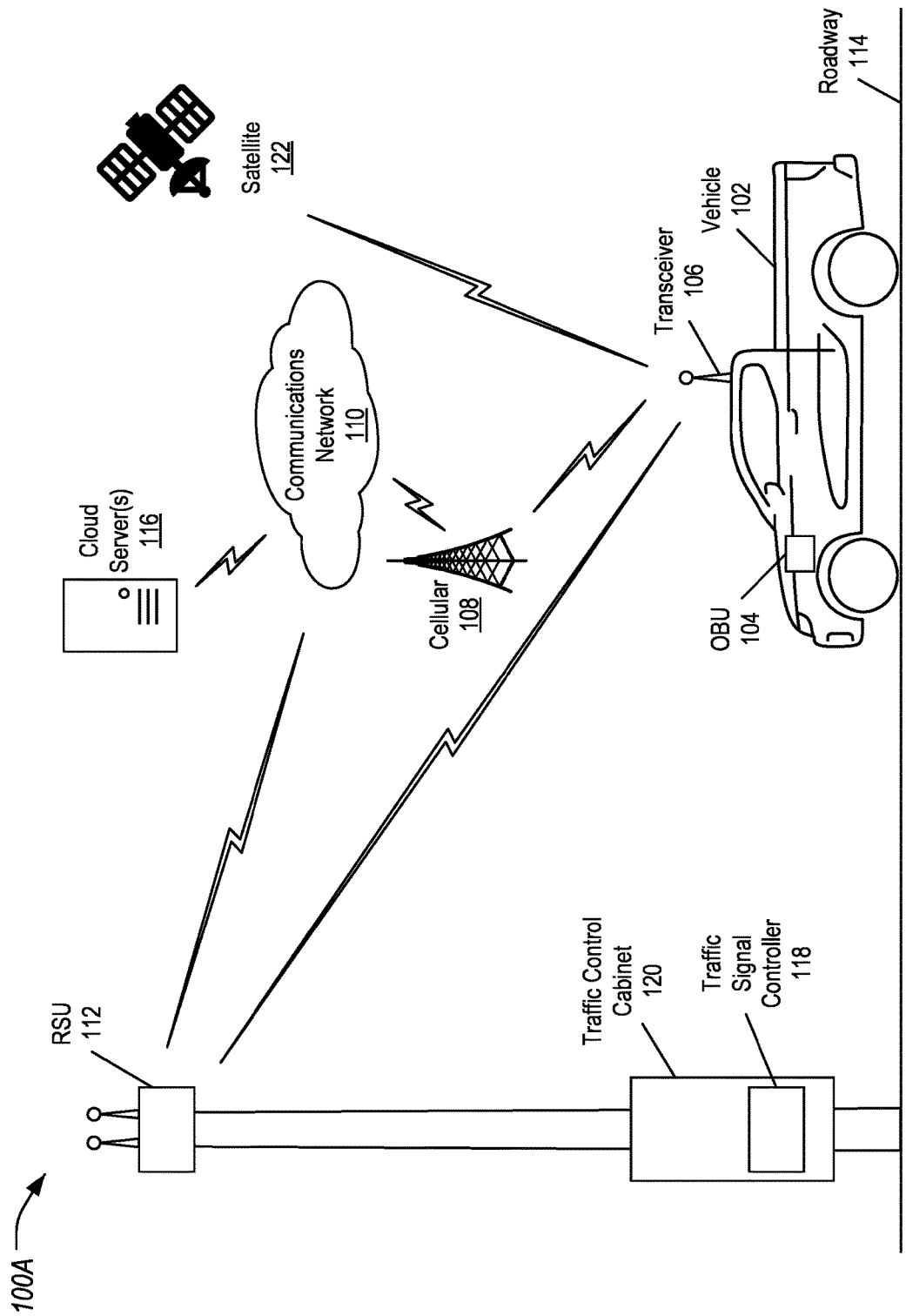
FIG. 1A illustrates an example system for the filtering of V2I messages in advance of security verification or other processing of the messages.

FIG. 1A illustrates an example system 100A for the filtering of V2I messages in advance of security verification or other processing of the messages. As shown, the system 100A includes a wireless-enabled vehicle 102 configured to travel along a roadway 114. The vehicle 102 includes an OBU 104 and a transceiver 106. The system 100A also includes traffic control installation that includes a RSU 112 and a traffic signal controller 118 located within a traffic control cabinet 120. The RSU 112 communicates with the traffic signal controller 118 over a local connection and with a cloud server 116 over a communications network 110. Using the OBU 104, the vehicle 102 communicates with the RSU 112 via the communications network 110, e.g., via cellular network 108 and/or satellite 122 communications.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The OBU 104 may be configured to provide telematics services to the vehicle 102. These services may include, as some non-limiting possibilities, navigation, turn-by-turn directions, vehicle health reports, local business search, accident reporting, and hands-free calling. The OBU 104 may be in communication with a transceiver 106. The OBU 104 may accordingly be configured to utilize the transceiver 106 to communicate with a cellular network 108 over various protocols with a communications network 110 over a network protocol (such as Uu). The OBU 104 may, additionally, be configured to communicate over a broadcast peer-to-peer protocol (such as PC5), to facilitate V2X communications with devices such as the RSU 112. It should be noted that these protocols are merely examples, and different peer-to-peer and/or cellular technologies may be used.

The communications network 110 may provide communications services, such as packet-switched network services (e.g., Internet access, voice over Internet Protocol (VoIP) communication services), to devices connected to the communications network 110. An example of a communications network 110 is a cellular telephone network. For instance, the OBU 104 may access the cellular network via connection to one or more cellular towers. To facilitate the communications over the communications network 110, the OBU 104 may be associated with unique device identifiers (e.g., mobile device numbers (MDNs), Internet protocol (IP) addresses, etc.) to identify the communications of the OBU 104 on the communications network 110 as being associated with the vehicle 102.

The RSU 112 may be a device with processing capabilities and networking capabilities, and may be designed to be placed in proximity of a roadway 114 for use in communicating with vehicles 102. In an example, the RSU 112 may include hardware configured to communicate over the broadcast peer-to-peer protocol (such as PC5), to facilitate V2X communications with the vehicles 102. The RSU 112 may also have wired or wireless backhaul capability to allow for communication with other elements of the communications network 110, such as the cloud server 116.

The RSU 112 may be further configured to communicate with a traffic signal controller 118. The traffic signal controller 118 may include one or more hardware devices configured to control operation of one or more traffic controls. In an example, the traffic signal controller 118 may be configured to control one or more traffic lights at an intersection along the roadway 114.

The traffic signal controller 118 may be mounted in a traffic control cabinet 120 for protection. The traffic control cabinet 120 may, in turn, be mounted to a utility pole, which may also be shared by the RSU 112 and/or the traffic controls themselves.

For positioning purposes, the vehicle OBU 104 may additionally include global navigation satellite system (GNSS) functionality to provide autonomous geo-spatial positioning for the vehicle 102. As some examples, the GNSS functionality may allow the vehicle 102 to determine its position using one or more satellites 122, such as global positioning system (GPS), GLONASS, Galileo, Beidou and/or others.

It should be noted that the system 100A shown in FIG. 1A is merely an example, and systems having more, fewer, and different arrangements of elements may be used. For instance, one or more of the OBU 104, RSU 112, cloud server 116, and traffic signal controller 118, may be combined into a single device. Moreover, while one vehicle 102 along one roadway 114 is shown, it is contemplated that systems 100A would include many vehicles 102 and roadways 114 to traverse.

Figure 1B:
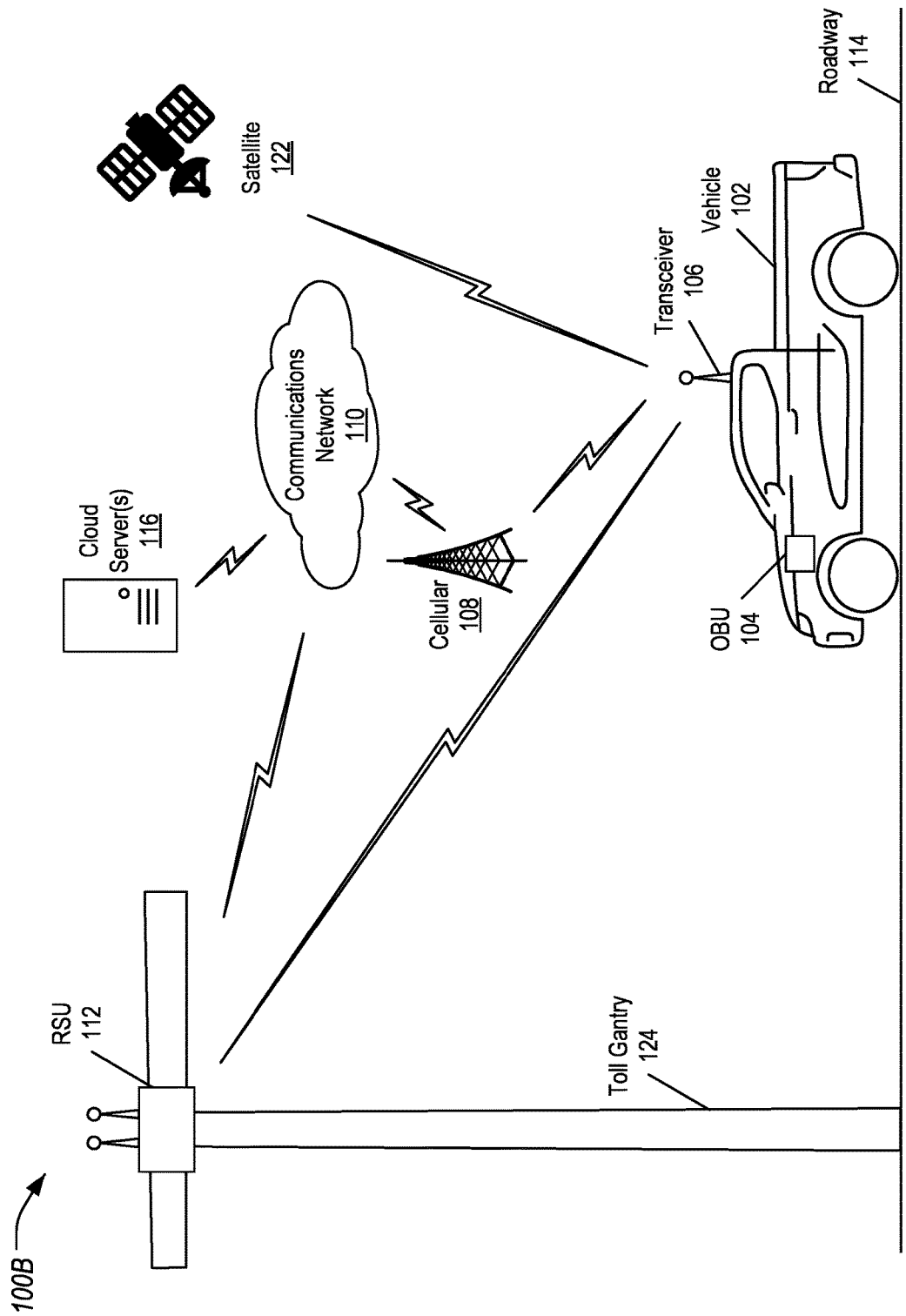
FIG. 1B illustrates an alternate example system for the filtering of V2I messages in advance of security verification or other processing of the messages.

FIG. 1B illustrates an alternate example system 100B for the filtering of V2I messages in advance of security verification or other processing of the messages. In the system 100B, the RSU 112 is in communication with a toll gantry 124, as opposed to a traffic control cabinet 120. Thus, the system 100B may be utilized for tolling use cases, as compared to the system 100A which may be used for traffic control use cases.

Figure 2:
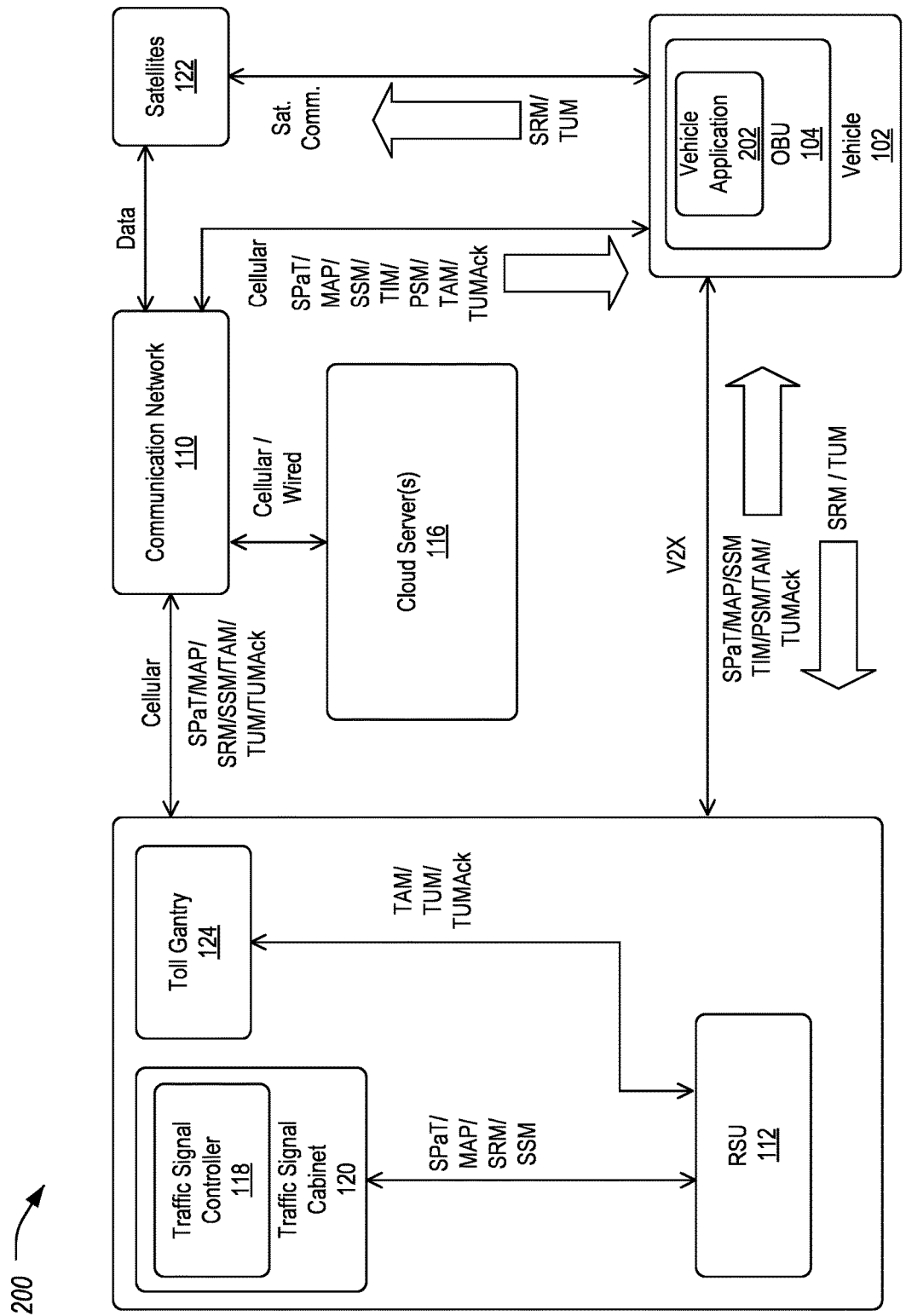
FIG. 2 illustrates an example diagram of data flow between elements of the system.

FIG. 2 illustrates an example diagram 200 of data flow between elements of the systems 100A, 100B. These data elements may include, as some examples, signal phase and timing information (SPaT), map data (MAP), signal request messages (SRMs), SSMs, BSMs, traffic incident messages (TIMs), PSMs, etc. The SPaT may be used to convey the current status of one or more signalized intersections, such as signal state of the intersection and how long this state will persist for each approach and lane that is active. The MAP messages may be used to convey many types of geographic road information, and may describe the physical geometry of one or more intersections. The MAP messages may be broadcast periodically and may contain various element descriptive of one or more intersections or road segments. The SRM may request preempt or priority services for selected user groups, and may be used for either a priority signal request or a preemption signal request depending on the way the request is set. The SSM may be used to relate the current status of the signal and the collection of pending or active preemption or priority requests acknowledged by the controller. The BSM may be used in a variety of applications to exchange data regarding vehicle state. The TIM message may be used to contain various roadway or other condition information. For instance, TIM messages may be used to provide information with respect to weather conditions, road obstacles, traffic signage, road conditions, or other general information. The PSM message may include information with respect to pedestrians, as described in further detail in the J2945/9 standard.

As shown, the RSU 112 and the traffic signal controller 118 may communicate over a local connection, such as a Wi-Fi connection or a wired connection. The RSU 112 and the traffic signal controller 118 may communicate data such as SPaT, MAP, SRM, and SSM messages. Also as shown, the RSU 112 and the toll gantry 124 may communicate over a local connection, such as a Wi-Fi connection or a wired connection. The RSU 112 and the toll gantry 124 may communicate data such as toll access message (TAM), toll usage message (TUM), and toll usage message acknowledgement (TUMAck) messages.

The RSU 112 and the vehicle 102 may communicate over a V2X connection. The RSU 112 may communicate data to the vehicle 102 such as SPaT, MAP, SSM, TIM, PSM, and TAM messages. The vehicle 102 may communicate data to the RSU 112 such as SRM messages. The vehicle 102 may also receive GNSS information via satellite 122. This information may be used by the vehicle 102 to locate itself along the roadway 114 and/or to perform tolling transactions with the toll gantry 124.

The traffic signal controller 118 may communicate over a cellular connection with the communications network 110. The traffic signal controller 118 and the communications network 110 may communicate data such as SPaT, MAP, SRM, and SSM messages. This data may be sent to or received by the cloud server(s) 116, and/or the vehicle 102, depending on circumstance. Similarly, the toll gantry 124 and the communications network 110 may communicate data such as TAM messages.

The vehicle 102 may also communicate over a cellular connection with the communications network 110. The communications network 110 may communicate data to the vehicle 102 such as SPaT, MAP, SSM, TIM, PSM, and TAM messages. The vehicle 102 may communicate data to the communications network 110 such as SRM messages. This data may be sent to or received by the cloud server 116, the traffic signal controller 118, and/or the toll gantry 124, depending on circumstance. The cloud server 116 may communicate over a wireless and/or wired connection to the communications network 110.

The traffic signal controller 118 may be configured to output the current movement state (e.g., signal phase and timing) for the signalized intersection. The traffic signal controller 118 may also be configured to forward the MAP, SRM, and SSM messages to the RSU 112. The RSU 112 may be configured to forward and/or broadcast the SPaT data received from the traffic signal controller 118 along with a MAP message, which describes the geometric layout of the intersection, to the vehicle 102.

Regarding the communication over the communications network 110, the SPaT and MAP data may be forwarded and/or broadcast through the communications network 110 to the vehicle 102. If so equipped, such communication may additionally and/or alternately be performed via satellite 122 communications.

The OBU 104 of the vehicle 102 may be configured to execute a vehicle application 202 configured to cause the vehicle 102 to perform various processes described in detail herein. These processes may include the filtering of V2I messages in advance of security verification or other processing of the messages.

Figure 3:
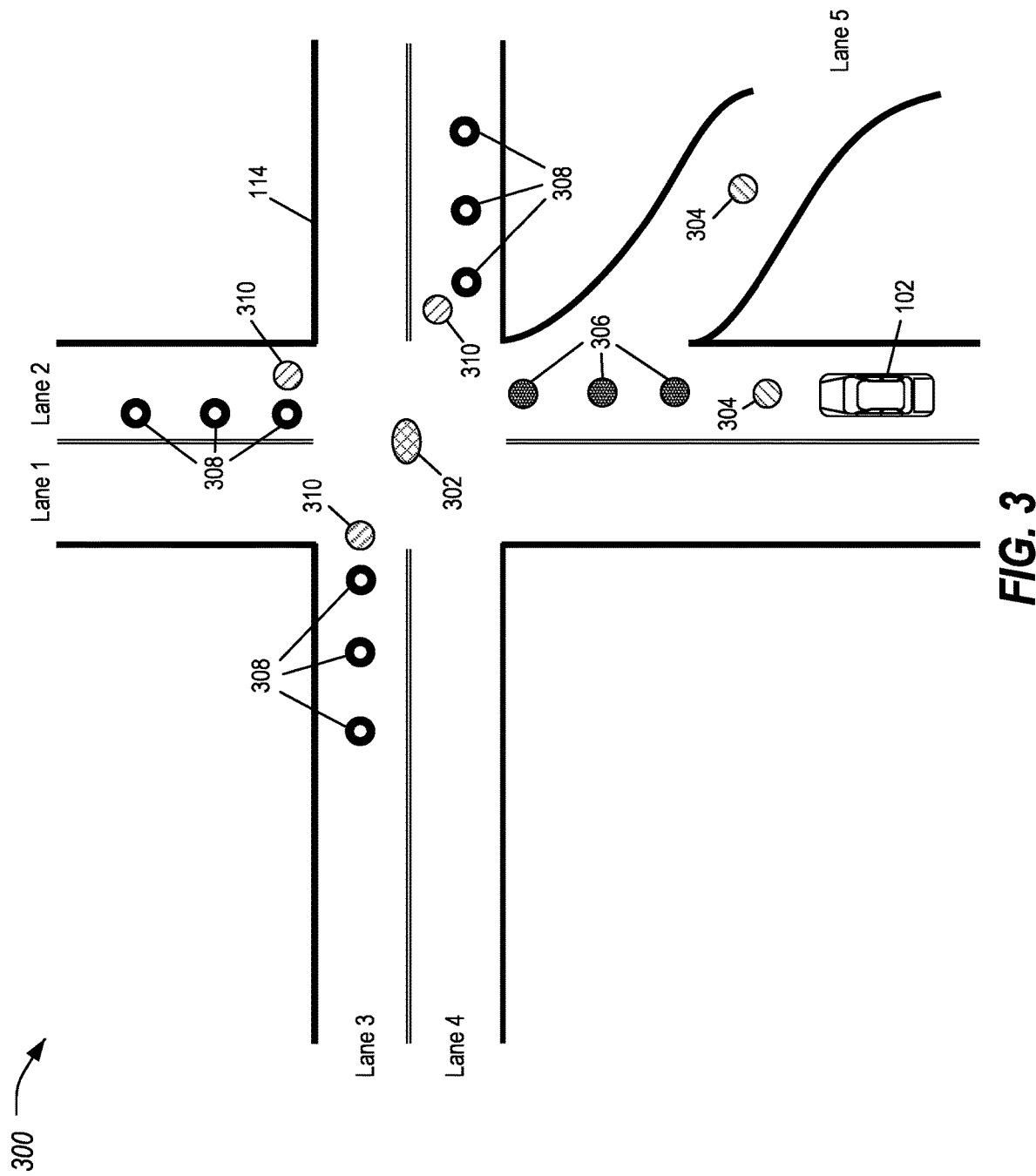
FIG. 3 illustrates an example intersection as defined by signal status messages (SSMs) and/or MAP messages received by a vehicle.

FIG. 3 illustrates an example intersection 300 as defined by SSM and MAP messages received by a vehicle 102. A vehicle 102 may receive the SSM and MAP messages via the OBU 104 when in the vicinity of an RSU 112 for the intersection 300. The intersection 300 as shown has five lanes. The received information includes an intersection reference point 302 for the intersection 300, a check-in location 304 for each lane inbound lane of the intersection 300, one or more ingress points 306 for inbound lanes of the intersection 300, one or more egress points 308 for each outbound lane of the intersection 300, and a check-out location 310 for each outbound lane of the intersection 300. It should be noted that for simplicity only a portion of the locations are shown in the example intersection 300, to illustrate a portion most relevant to current movement of the vehicle 102.

The intersection reference point 302 may refer to a location specified by the messages from which locations of the other elements of the intersection 300 may be computed. The check-in locations 304 may indicate locations relative to the intersection reference point 302 for each lane. For instance, responsive to the geographic coordinates of the vehicle 102 matching one of the check-in locations 304 of the intersection 300, the vehicle application 202 of the OBU 104 may identify that the vehicle 102 is entering the vicinity of the intersection 300 defined by the of the check-in locations 304.

Similarly, the ingress points 306 may indicate locations relative to the intersection reference point 302 for each lane that indicate the vehicle 102 is entering the intersection 300 itself. The ingress points 306 may generally be closer into the intersection 300, as compared to the check-in locations 304 which may be of a greater distance, and may indicate locations that show the progress of the vehicle 102 along a lane into the intersection 300. The egress points 308 may likewise indicate locations relative to the intersection reference point 302 for each lane that indicate the vehicle 102 is exiting the intersection 300 itself. The check-out locations 310 may similarly indicate locations relative to the intersection reference point 302 for each lane that indicate the vehicle 102 is no longer to be considered in the vicinity of the intersection 300.

Figure 4:
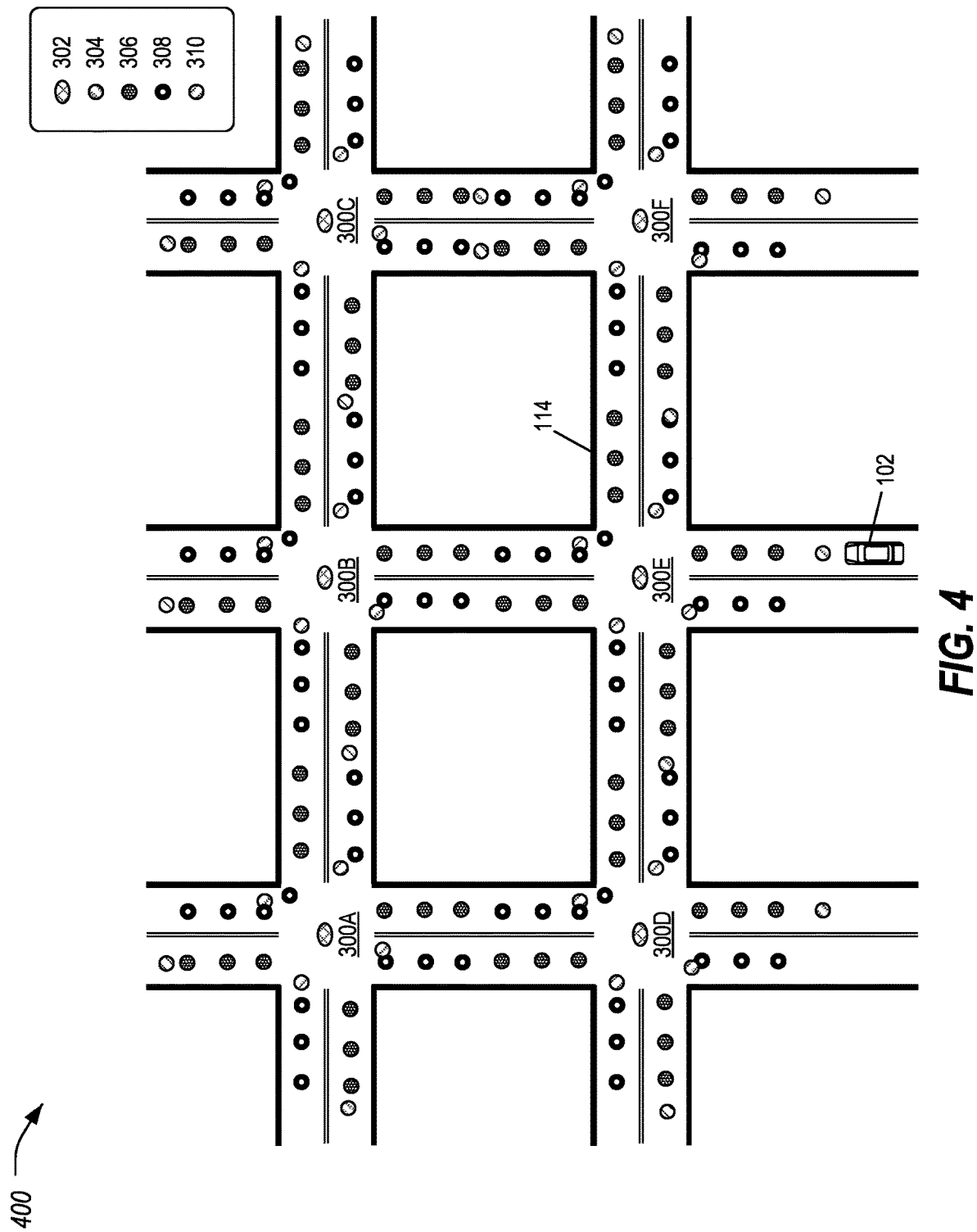
FIG. 4 illustrates an example of multiple intersections available to be traversed by a vehicle.

FIG. 4 illustrates an example 400 of multiple intersections 300 available to be traversed by a vehicle 102. As shown, the example 400 shows six intersections 300A-300F, each of which has its own intersection reference point 302, check-in locations 304, ingress points 306, egress points 308, and check-out locations 310. The vehicle 102 may receive MAP and SSM messages from more than one of the intersections 300A-300F, due to the close proximity of the vehicle 102 to the RSUs 112 corresponding to the intersections 300. To verify such communications, it may be computationally complex to verify each and every message. Moreover, such verification may affect time-sensitive operations due to the processing of messages that are irrelevant to the location of the vehicle 102 (e.g., relating to an intersection 300 that the vehicle 102 is not entering) or otherwise not of interest. It may also be unnecessary to perform verification for every message from the RSUs 112, e.g., every 100 milliseconds. Message filtering by utilizing high-definition static maps in combination with complex vehicle 102 localization may be impractical. Additionally, the effect on the RSU 112 transmission side of the messages for signing each message may be burdensome as well.

Figure 5A:
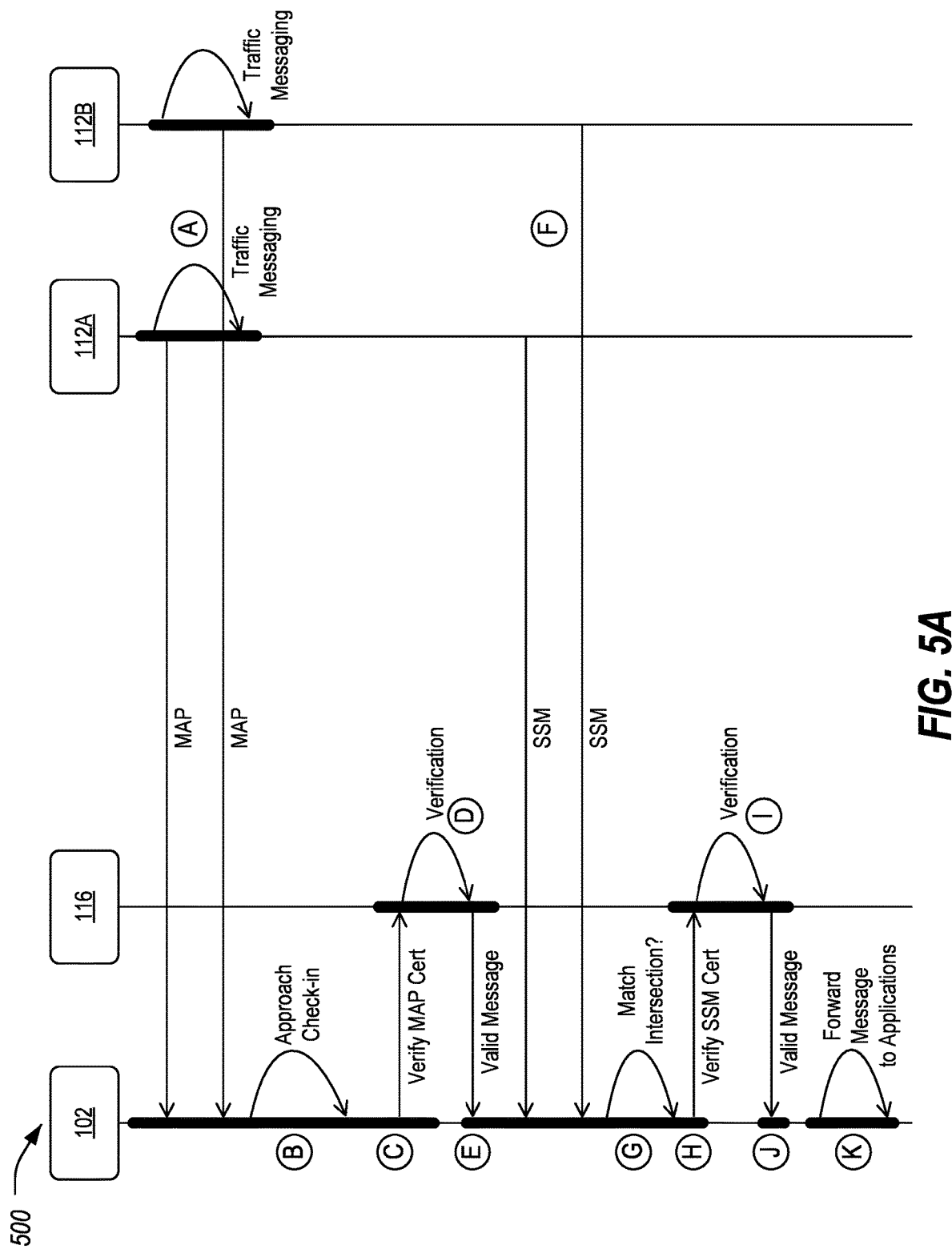
FIG. 5A illustrates a first portion of an example data flow for the operation of the vehicle application in an intersection scenario for the filtering of V2I messages in advance of security verification or other processing of the messages.
Figure 5B:
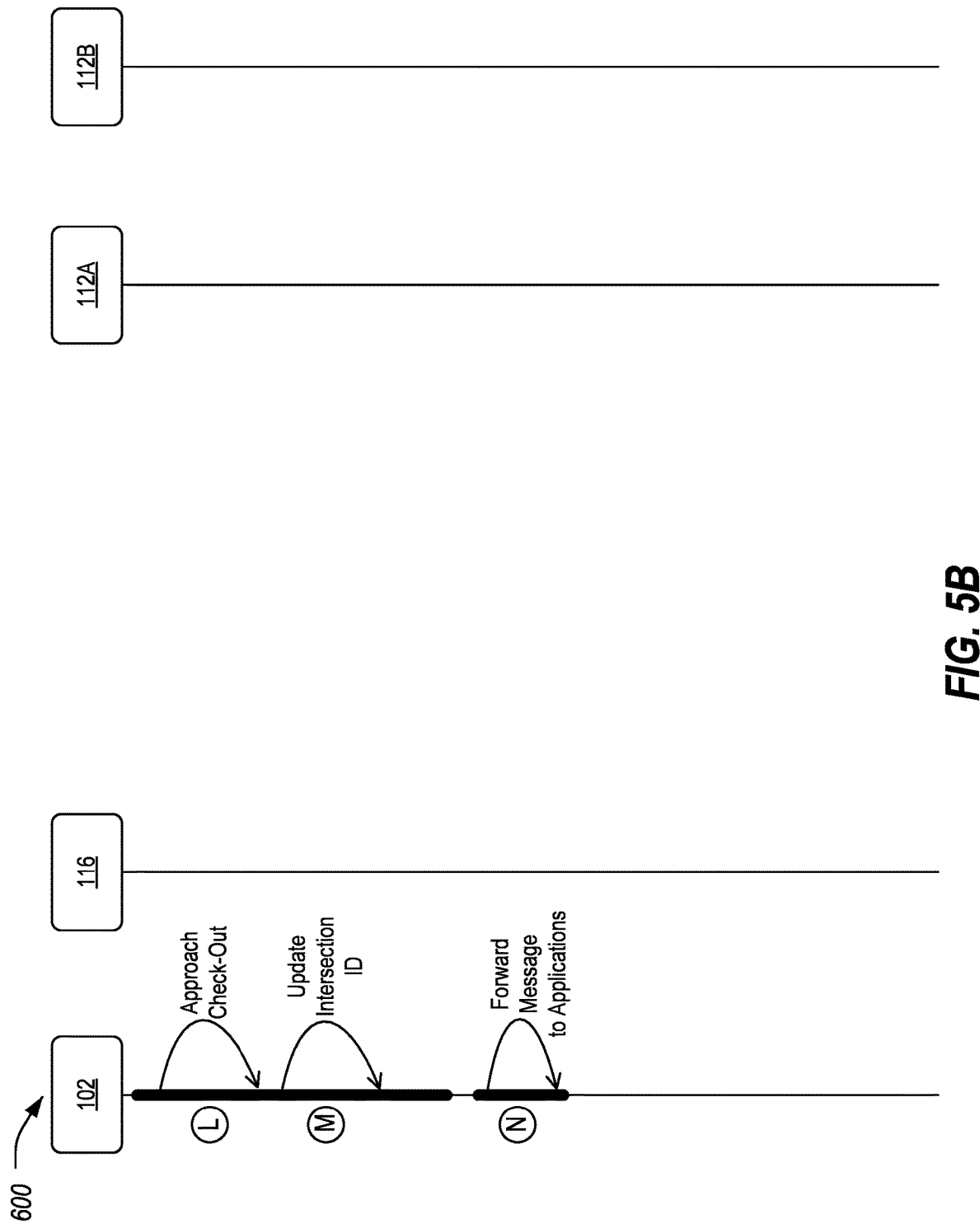
FIG. 5B illustrates a second portion of an example data flow for the operation of the vehicle application in an intersection scenario for the filtering of V2I messages in advance of security verification or other processing of the messages.

FIGS. 5A-5B collectively illustrate an example data flow 500 for the operation of the vehicle application 202 in an intersection 300 scenario for the filtering of V2I messages in advance of security verification or other processing of the messages. In an example, the data flow 500 may involve components of the system 100A as discussed in detail above.

At index (A), the vehicle 102 receives MAP messages from RSUs 112. As shown, the vehicle 102 may be receiving MAP messages from a first RSU 112A and also from a second RSU 112B. It should be noted that this is only one possibility, and an arbitrary number of RSUs 112 may be in communication distance to the OBU 104 of the vehicle 102.

At index (B), the vehicle 102 approaches a check-in location 304 of an intersection 300. In an example, the vehicle 102 may utilize GNSS functionality to determine the current vehicle 102 location and may identify that the vehicle 102 has reaches a check-in location 304 specified by the MAP message for one of the intersections 300. If so, the vehicle 102 notes the identifier of the intersection 300 from the MAP message as being the current checked-in intersection 300. In some examples, the vehicle 102 may identify a current position and/or heading of the vehicle 102, may ensure that the MAP messages are a match to the checked-in intersection 300 based on the current position and/or heading before performing security verification of the MAP messages. This may allow the vehicle 102 to not have to perform the security processing of MAP messages that are not for the checked-in intersection 300.

At index (C), the vehicle 102 send the certificate from the MAP message to a security service of the vehicle 102 for verification. The certificate may have been included in the MAP message from a hardware security module (HSM) of the sending RSU 112 (e.g., first RSU 112A, second RSU 112B, etc.). The RSU 112 may periodically refresh its certificate to include in the MAP messages via a connection to a backend Security Credential Management System (SCMS). In an example, the security service may implement a secure data service (SDS) via the Wireless Access in Vehicular Environments (WAVE) protocol as defined by Institute of Electrical and Electronics Engineer (IEEE) 1609.2 WAVE standard. The security service may be implemented to perform validation of the certificate to ensure that the MAP message is authentic and/or authorized. This validation is shown at index (D). At index (E), the security service replies with the indication of whether the MAP message is valid. If so, the data flow 500 continues as shown. If not, the data flow 500 ends (not shown).

At index (F), the vehicle 102 receives SSM messages from RSUs 112. These messages may be broadcast by the RSUs 112 based on data received from the traffic signal controller 118. As shown, the vehicle 102 may be receiving SSM messages from a first RSU 112A and also from a second RSU 112B. It should be noted that this is only one possibility, and an arbitrary number of RSUs 112 may be in communication distance to the OBU 104 of the vehicle 102.

At index (G), the vehicle 102 determines whether the received SSM messages match the current intersection 300 of the vehicle 102. In an example, the vehicle 102 may compare an intersection 300 identifier included in the SSM messages with the intersection 300 check-in location 304 identified at index (B). If the SSM is for the checked-in intersection 300, the data flow 500 continues to process that message. If not, the data flow 500 terminates with respect to that SSM message. In some examples, the vehicle 102 may further identify a current position and/or heading of the vehicle 102, may ensure that the SSM messages are a match to the checked-in intersection 300 based on the current position and/or heading before performing security verification of the SSM messages. This may allow the vehicle 102 to not have to perform security processing of SSM messages that are not for the checked-in intersection 300.

At index (H), the vehicle 102 verifies the certificate from the SSM message using the security service. This verification is performed at index (I), similar to as discussed with respect to indexes (C) and (D) for the MAP messages. The result is returned to the vehicle 102 at index (J), similar to as discussed above with respect to index (E).

At index (K), if the SSM message is confirmed to be valid, the SSM message may be forwarded on to vehicle applications 202 for use. Thus, the messages that are forwarded along include only those messages that match the current intersection 300 and also that are validated via the security service. The other messages that do not match may be discarded.

Referring to FIG. 5B, at index (L) the vehicle 102 approaches a check-out location 310 of the intersection 300. In an example, the vehicle 102 may utilize GNSS functionality to determine the current vehicle 102 location and may identify that the vehicle 102 has reaches the check-out location 310 specified by the MAP message the current checked-in intersection 300.

If so, at index (M) the vehicle 102 notes the identifier of the intersection from the MAP message as no longer being the current checked-in intersection 300. Instead, the vehicle 102 may, for example, indicate that no intersection 300 is the current checked-in intersection 300.

At index (N), the vehicle 102 indicates to the vehicle applications 202 that there is no longer a checked-in intersection 300. This may allow the vehicle application 202 to update their state, in an example, to no longer perform intersection 300 services, and/or to indicate to navigation that the vehicle 102 as exiting the intersection 300. After index (N), the data flow 500 ends. As a variation, it should be noted that at indexes (M)-(N) the vehicle 102 may also identify that the exit from the current checked-in intersection 300 leads to a new current checked-in intersection 300. For instance, the vehicle 102 may identify a current position and/or heading of the vehicle 102, and may ensure that the vehicle 102 location and/or heading are a match to the check-in location 304 of the next toll gantry 124. In such a case, the current checked-in intersection 300 may be updated to the new intersection 300 being approached.

Figure 6:
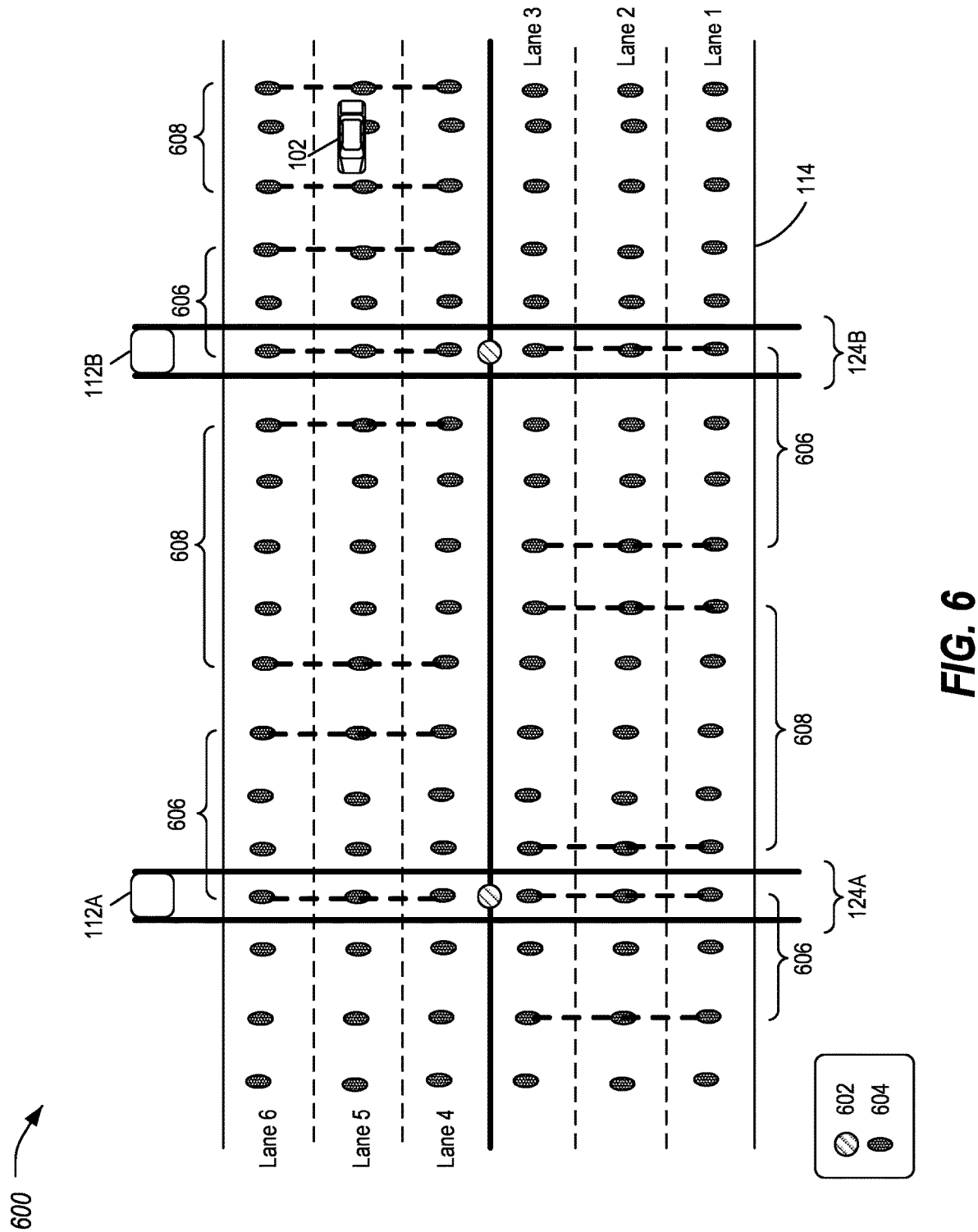
FIG. 6 illustrates an example of multiple toll gantries available to be traversed by a vehicle.

FIG. 6 illustrates an example 600 of multiple toll gantries 124A-B (collectively toll gantries 124) available to be traversed by a vehicle 102. As shown, a first toll gantry 124A and a second toll gantry 124B each extend across lanes of the roadway 114. The first RSU 112A is in operation in control of the toll gantry 124A. Similarly, the second RSU 112B is in operation in control of the toll gantry 124B. The lanes of the roadway 114 include, for example, in a first travel direction, a first lane, a second lane, a third lane, and a fourth lane. The illustrated roadway 114 further includes a center median, and lanes in a second travel direction, namely, a fifth lane, a sixth lane, a seventh lane, and an eighth lane. It should be noted that the particular roadway layout is merely an example.

The TAM messages may include map information indicative of the layout of the roadway 114, such as an intersection geometry list and a road segment list. The road segment list includes various properties of the roadway 114, including lane description, high occupancy status, whether lanes are available or are dedicated to high priority traffic, and so on. This information may include, for instance, indications of the layout of the lanes of the roadway 114, which may be used to allow vehicles 102 to identify when a tolled area is approached, as well as in which lane the vehicle 102 is traveling.

The geometry list may include toll road geometry information with respect to the placement of lanes in a toll area. For instance, the TAM messages may include a toll geometry reference, which may indicate a reference point 602 indicating the geographic location of the toll gantry 124 from which locations of the tolling area may be computed (e.g., shown as reference points 602 for each of the toll gantries 124). The TAM messages may also indicate lane node offsets 604 relative to the reference point 602 for the toll gantry 124, as well which of the lane node offsets 604 indicate a trigger zone 606 in which a toll is to be completed, or geometry locations 608 before the trigger zone 606. The TAM messages may also include toll context data, such as times of day, carpool lanes, or other restrictions or context on the use of the roadway 114.

Which lane node offsets 604 to use may depend on the direction of travel of the vehicle 102. For example, the vehicle 102 is traveling in the travel direction from right to left in the example 600, and therefore may reference its location with respect to the lane node offsets 604 for the lanes in that travel direction (e.g., lanes five through eight). These lane node offsets 604 may make up a toll advertisement zone for the second travel direction. The lane node offsets 604 for each lane may collectively define the trigger zone 606 in which the vehicle 102 may be configured to pay the toll.

The vehicle 102 may receive TAM messages from more than one of the toll gantries 124, due to the close proximity of the vehicle 102 to the RSUs 112 corresponding to the toll gantries 124. To verify such communications, it may be computationally complex to verify each and every message. Moreover, such verification may affect time-sensitive operations due to the processing of messages that are irrelevant to the location of the vehicle 102 (e.g., relating to a toll gantry 124 that the vehicle 102 is not entering, relating to a toll gantry 124 the vehicle 102 is heading away from, etc.) or otherwise not of interest. As noted above, it may also be unnecessary to perform verification for every message from the RSUs 112, e.g., every 100 milliseconds. Message filtering by utilizing high-definition static maps in combination with complex vehicle 102 localization may be impractical. Additionally, the effect on the RSU 112 transmission side of the TAM or other tolling messages for signing each message may be burdensome as well.

Figure 7A:
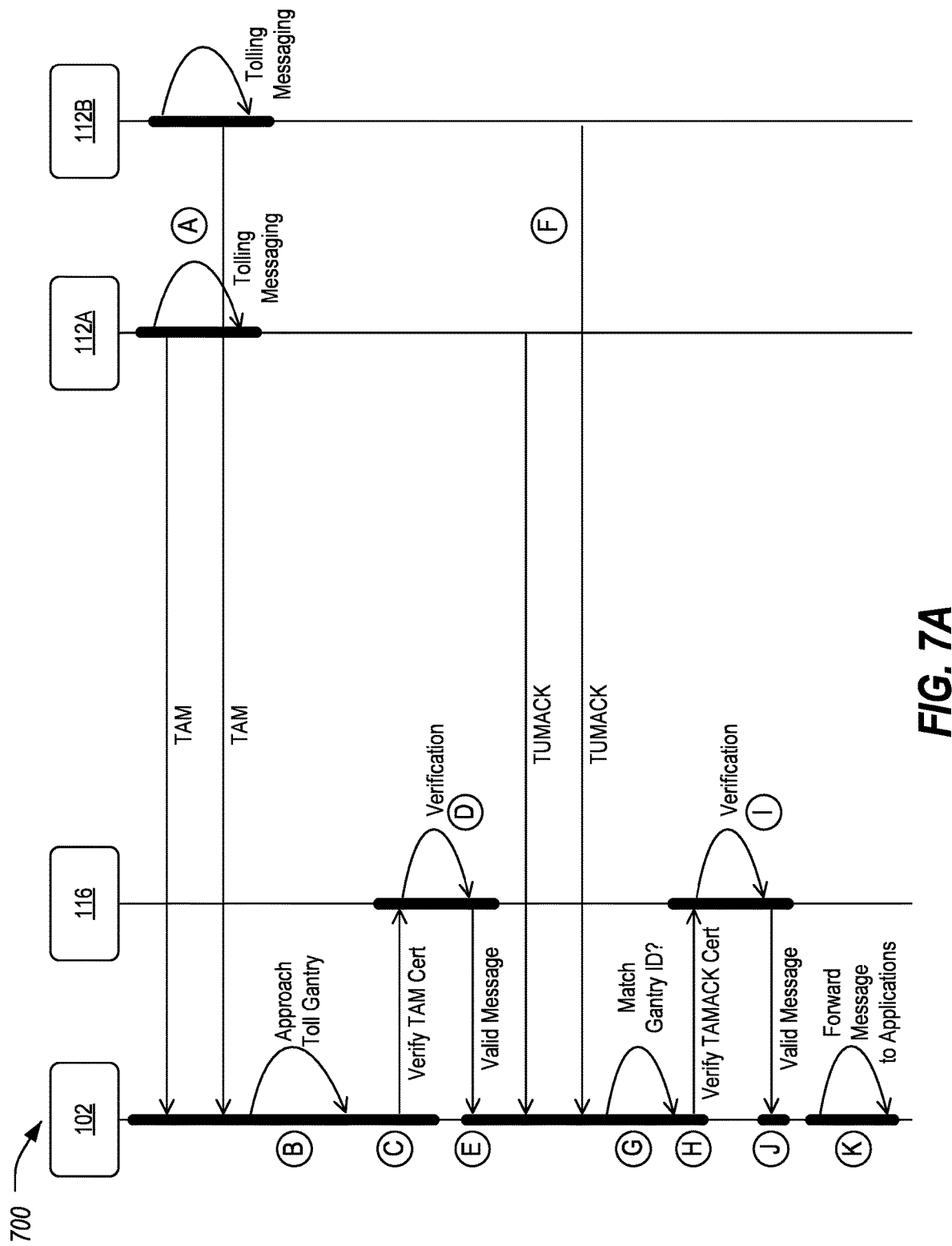
FIG. 7A illustrates a first portion of an example data flow for the operation of the vehicle application for filtering of V2I messages in a tolling scenario, in advance of security verification or other processing of the messages.
Figure 7B:
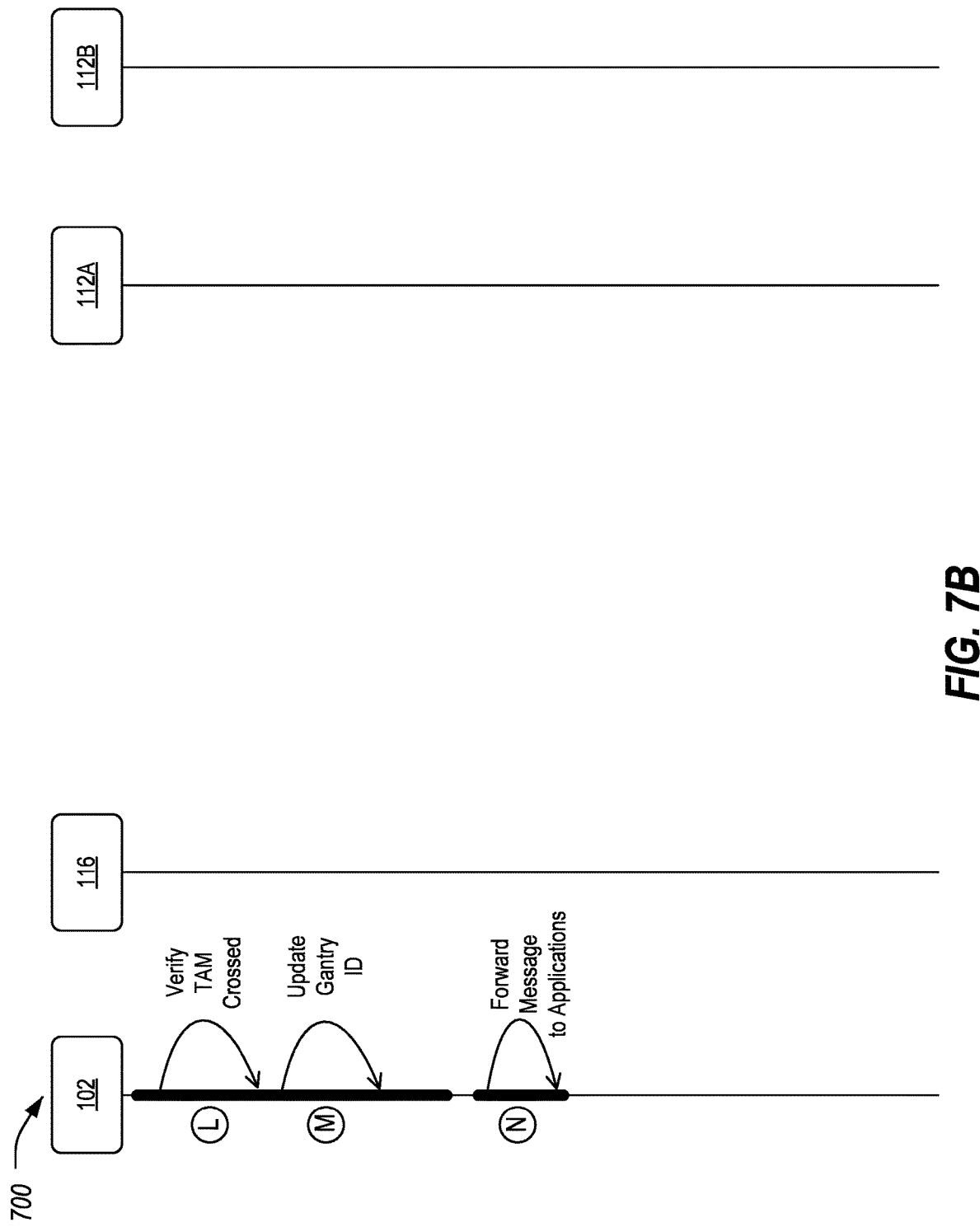
FIG. 7B illustrates a second portion of an example data flow for the operation of the vehicle application for filtering of V2I messages in a tolling scenario, in advance of security verification or other processing of the messages.

FIGS. 7A-7B collectively illustrate an example data flow 700 for the operation of the vehicle application 202 in a tolling scenario for filtering of V2I messages, in advance of security verification or other processing of the messages. In an example, the data flow 700 may involve components of the system 100B as discussed in detail above.

At index (A), the vehicle 102 receives TAM messages from RSUs 112. As shown, the vehicle 102 may be receiving TAM messages from a first RSU 112A and also from a second RSU 112B. It should be noted that this is only one possibility, and an arbitrary number of RSUs 112 may be in communication distance to the OBU 104 of the vehicle 102.

At index (B), the vehicle 102 approaches a lane node offset 604 of the toll gantry 124. In an example, the vehicle 102 may utilize GNSS functionality to determine the current vehicle 102 location and may identify that the vehicle 102 has reaches a lane node offset 604 specified by the TAM message for one of the toll gantry 124. If so, the vehicle 102 notes the identifier of the toll gantry 124 from the TAM message as being the current checked-in toll gantry 124. In some examples, the vehicle 102 may identify a current position and/or heading of the vehicle 102, may ensure that the TAM messages are a match to the checked-in toll gantry 124 based on the current position and/or heading before performing security verification of the TAM messages. This may allow for the vehicle 102 to not have to perform security processing of TAM messages that are not for the checked-in toll gantry 124.

At index (C), the vehicle 102 send the certificate from the TAM message to a security service for verification. The certificate may have been included in the TAM message from a HSM of the sending RSU 112 (e.g., first RSU 112A, second RSU 112B, etc.). The RSU 112 may periodically refresh its certificate to include in the TAM messages via a connection to a backend SCMS. In an example, the security service may implement a SDS via the WAVE protocol as defined by IEEE 1609.2 WAVE standard. The security service may be implemented, in one example, to perform validation of the certificate to ensure that the TAM message is authentic and/or authorized. This validation is shown at index (D). At index (E), the security service replies with the indication of whether the TAM message is valid. If so, the data flow 700 continues as shown. If not, the data flow 700 ends (not shown).

At index (F), the vehicle 102 receives TUMAck messages from RSUs 112. These messages may be broadcast by the RSUs 112 based on data received from the toll gantry 124. As shown, the vehicle 102 may be receiving TUMAck messages from a first RSU 112A and also from a second RSU 112B. It should be noted that this is only one possibility, and an arbitrary number of RSUs 112 may be in communication distance to the OBU 104 of the vehicle 102.

At index (G), the vehicle 102 determines whether the received TUMAck messages match the current gantry id of the toll gantry 124 noted by the vehicle 102. In an example, the vehicle 102 may compare a gantry identifier included in the TUMAck messages with the checked-in gantry identifier identified at index (B). If the TUMAck is for the checked-in toll gantry 124, the data flow 500 continues to process that message. If not, the data flow 500 terminates with respect to that TUMAck message. In some examples, the vehicle 102 may further identify a current position and/or heading of the vehicle 102, may ensure that the TUMAck messages are a match to the checked-in toll gantry 124 based on the current position and/or heading before performing security verification of the TUMAck messages. This may allow for the vehicle 102 to not have to perform security processing of TUMAck messages that are not for the checked-in toll gantry 124.

At index (H), the vehicle 102 verifies the certificate from the TUMAck message using the security service. This verification is performed at index (I), similar to as discussed with respect to indexes (C) and (D) for the TAM messages. The result is returned to the vehicle 102 at index (J), similar to as discussed above with respect to index (E).

At index (K), if the TUMAck message is confirmed to be valid, the TUMAck message may be forwarded on to vehicle applications 202 for use. Thus, the messages that are forwarded along include only those messages that match the current intersection 300 and also that are validated via the security service. The other messages that are not matching or valid may accordingly be discarded.

Referring to FIG. 7B, at index (L) the vehicle 102 exits the trigger zone 606 of the toll gantry 124. In an example, the vehicle 102 may utilize GNSS functionality to determine the current vehicle 102 location and may identify that the vehicle 102 has exited the trigger zone 606 specified by the TUM message for the current checked-in toll gantry 124.

If so, at index (M) the vehicle 102 notes the identifier of the toll gantry 124 from the TUM message as no longer being the current checked-in toll gantry 124. Instead, the vehicle 102 may, for example, indicate that no toll gantry 124 is the current checked-in toll gantry 124.

At index (N), the vehicle 102 indicates to the vehicle applications 202 that there is no longer a checked-in toll gantry 124. This may allow the vehicle application 202 to update their state, in an example, to no longer perform tolling services, and/or to indicate to navigation that the vehicle 102 as exiting the toll gantry 124. After index (N), the data flow 700 ends. As a variation, it should be noted that at indexes (M)-(N) the vehicle 102 may also identify that the exit from the current checked-in toll gantry 124 leads to a new current checked-in toll gantry 124. For instance, the vehicle 102 may identify a current position and/or heading of the vehicle 102, and may ensure that the vehicle 102 location and/or heading are a match to the check-in location 304 of the next toll gantry 124. In such a case, the current checked-in toll gantry 124 may be updated to the new toll gantry 124 being approached.

Figure 8:
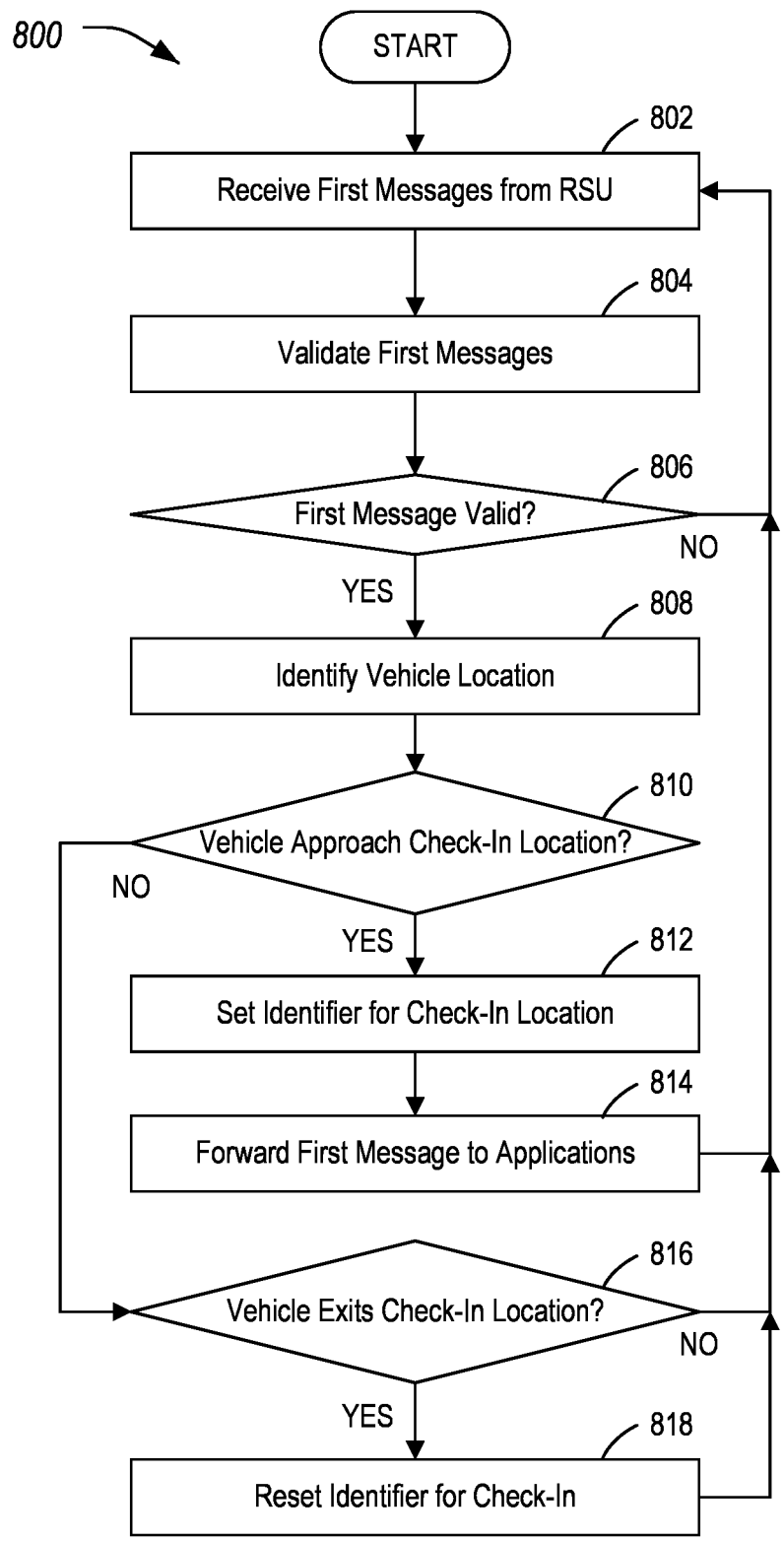
FIG. 8 illustrates a first portion of an example process for the filtering of V2I messages in advance of security verification or other processing of messages.

FIG. 8 illustrates an example first portion of a process 800 for the filtering of V2I messages in advance of security verification or other processing of messages. In an example, the process 800 may be performed by the vehicle 102 in the context of the system 100A and/or system 100B.

At operation 802, the vehicle 102 receives first messages from one or more RSUs 112. The OBU 104 of the vehicle 102 may be configured to receive wireless messages, and may receive first messages transmitted from the one or more RSU 112. In an example, the first messages may be MAP messages as discussed with respect to FIGS. 3, 4, and 5A-5B. In another example, the first messages may be TAM messages as discussed with respect to FIGS. 6 and 7A-7B.

At operation 804, the vehicle 102 performs validation on the first messages. In an example, this may include, ensuring that the intersection 300 and or toll gantry 124 indicated by the first messages is a match for the current vehicle 102 location and/or heading. If the first messages do not match, then the security verification does not have to be performed. If the first message match, the vehicle 102 may verify the first messages by retrieving a certificate from the messages, and sending the certificate for verification. The verification may be performed, in an example, in accordance with the WAVE protocol as discussed above. In an example, for each first message the vehicle 102 may send a verification request including the certificate, and may receive a response indicating whether the certificate indicates that the first message is valid.

At operation 806, the vehicle 102 determines if the first messages are valid. In an example, if the response indicates that the first message is valid, control proceeds to operation 808. If not, control returns to operation 802 to again receive first messages.

At operation 808, the vehicle 102 identifies the position of the vehicle 102. In an example the vehicle 102 may utilize GNSS or another positioning technology to determine the current location of the vehicle 102.

At operation 810, the vehicle 102 determines whether the vehicle 102 is approaching a check-in. In an example, using the location of the vehicle 102 determined at operation 808 and the information within the first messages (e.g., MAP messages), the vehicle 102 may determine if it has entered a check-in location 304 for an intersection 300. In another example, using the location of the vehicle 102 determined at operation 808 and the lane node offsets 604 within the first messages (e.g., TAM messages), the vehicle 102 may determine if it has entered a trigger zone 606 for a toll gantry 124. If so, control passes to operation 812. If not, control continues to operation 816.

At operation 812, the vehicle 102 sets the identifier for the check-in as being the current check-in. This identifier of the intersection 300 or toll gantry 124 may be retrieved from the first messages.

At operation 814, the vehicle 102 forwards the first messages to the vehicle application 202. Thus, the first messages that are forwarded along include only those first messages that match the current checked-in identifier and also that are validated via the security service. The other first messages that are not matching or valid may accordingly be discarded. After operation 814, control returns to operation 802.

At operation 816, the vehicle 102 determines whether the vehicle 102 is exiting a check-in. In an example, using the location of the vehicle 102 determined at operation 808 and the information within the first messages (e.g., MAP messages), the vehicle 102 may determine if it has entered a check-out location 310 for the intersection 300. In another example, using the location of the vehicle 102 determined at operation 808 and the lane node offsets 604 within the first messages (e.g., TAM messages), the vehicle 102 may determine if it has exited the trigger zone 606 for the toll gantry 124. If so, control passes to operation 818. If not, control continues to operation 802.

At operation 818, the vehicle 102 resets the identifier for the check-in. Thus the identifier of the current intersection 300 or current toll gantry 124 may be set to a value indicting that there is no current checked-in intersection 300 and/or toll gantry 124. After operation 818, control returns to operation 802.

Figure 9:
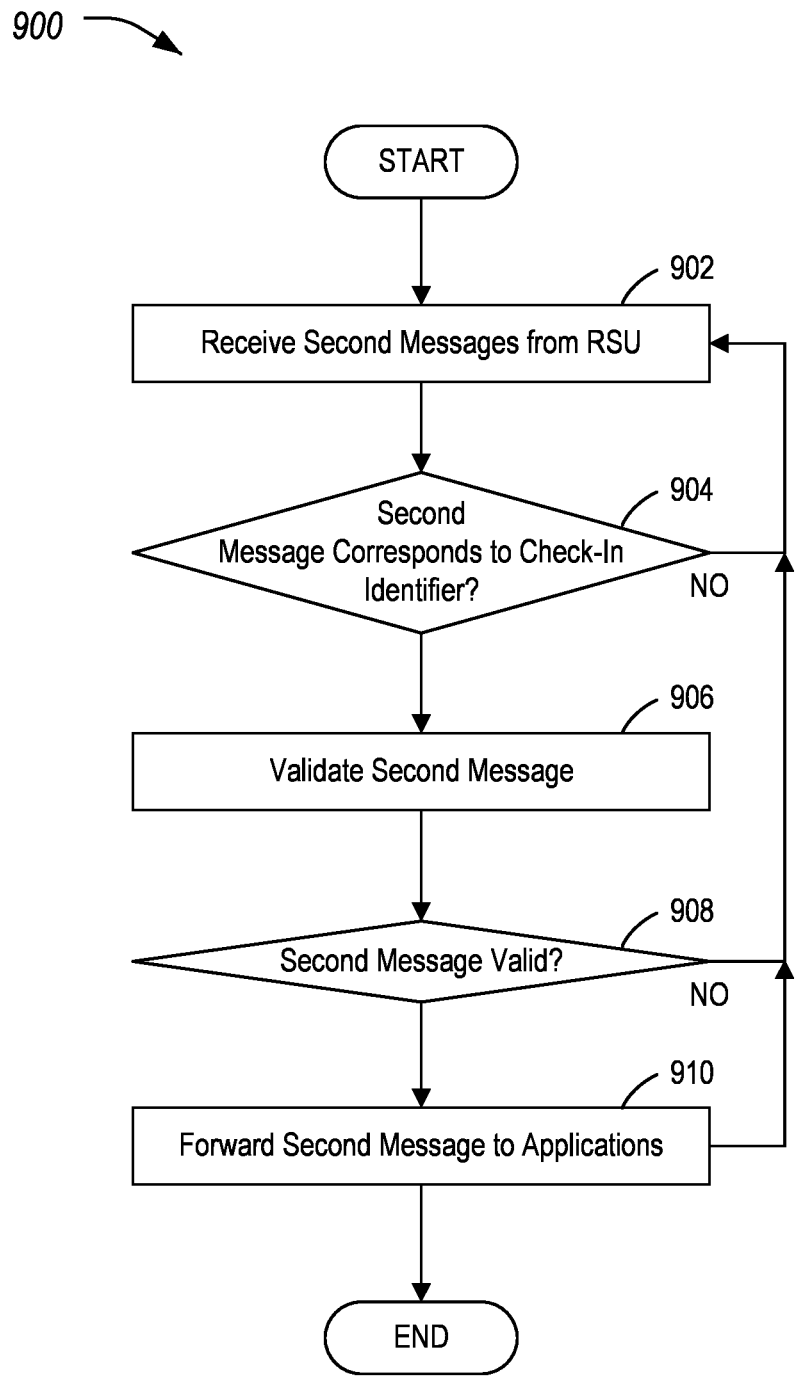
FIG. 9 illustrates a second portion of an example process for the filtering of V2I messages in advance of security verification or other processing of messages.

FIG. 9 illustrates an example second portion of a process 900 for the filtering of V2I messages in advance of security verification or other processing of messages. In an example, as with the first portion of the process 800, the process 900 may be performed by the vehicle 102 in the context of the systems 100A and/or 100B.

At operation 902, the vehicle 102 receives second messages from the one or more RSUs 112. Similar to operation 802, the OBU 104 of the vehicle 102 may be configured to receive wireless messages, and may receive second messages transmitted from the one or more RSU 112. In an example, the second messages may be SSM messages as discussed with respect to FIGS. 3, 4, and 5A-5B. In another example, the first messages may be TUMAck messages as discussed with respect to FIGS. 6 and 7A-7B.

At operation 904, the vehicle 102 determines whether the second message correspond to the check-in identifier. For instance, the identifier of the intersection 300 or toll gantry 124 may be retrieved from the second messages. This identifier may be compared to the identifier for the checked-in intersection 300 or checked-in toll gantry 124 as saved at operation 812. If the second message is a match, control proceeds to operation 906. Otherwise, control returns to operation 902.

At operation 906, the vehicle 102 validates the second message. In an example, this may include, ensuring that the intersection 300 and or toll gantry 124 indicated by the second messages is a match for the current vehicle 102 location and/or heading. If the second messages do not match, then the security verification does not have to be performed. If the second message match, the vehicle 102 may verify the second messages by retrieving a certificate from the messages, and sending the certificate for verification. The verification may be performed, in an example, in accordance with the WAVE protocol as discussed above. In an example, for each second message the vehicle 102 may send a verification request including the certificate, and may receive a response indicating whether the certificate indicates that the second message is valid.

At operation 908, the vehicle 102 determines whether the second message is valid. In an example, if the response indicates that the second message is valid, control proceeds to operation 910. If not, control returns to operation 902 to again receive second messages.

At operation 910, the vehicle 102 forwards the second message to the vehicle application 202. Thus, the second messages that are forwarded along include only those second messages that match the current checked-in identifier and also that are validated via the security service. The other second messages that are not matching or valid may accordingly be discarded. After operation 910, control returns to operation 902.

Figure 10:
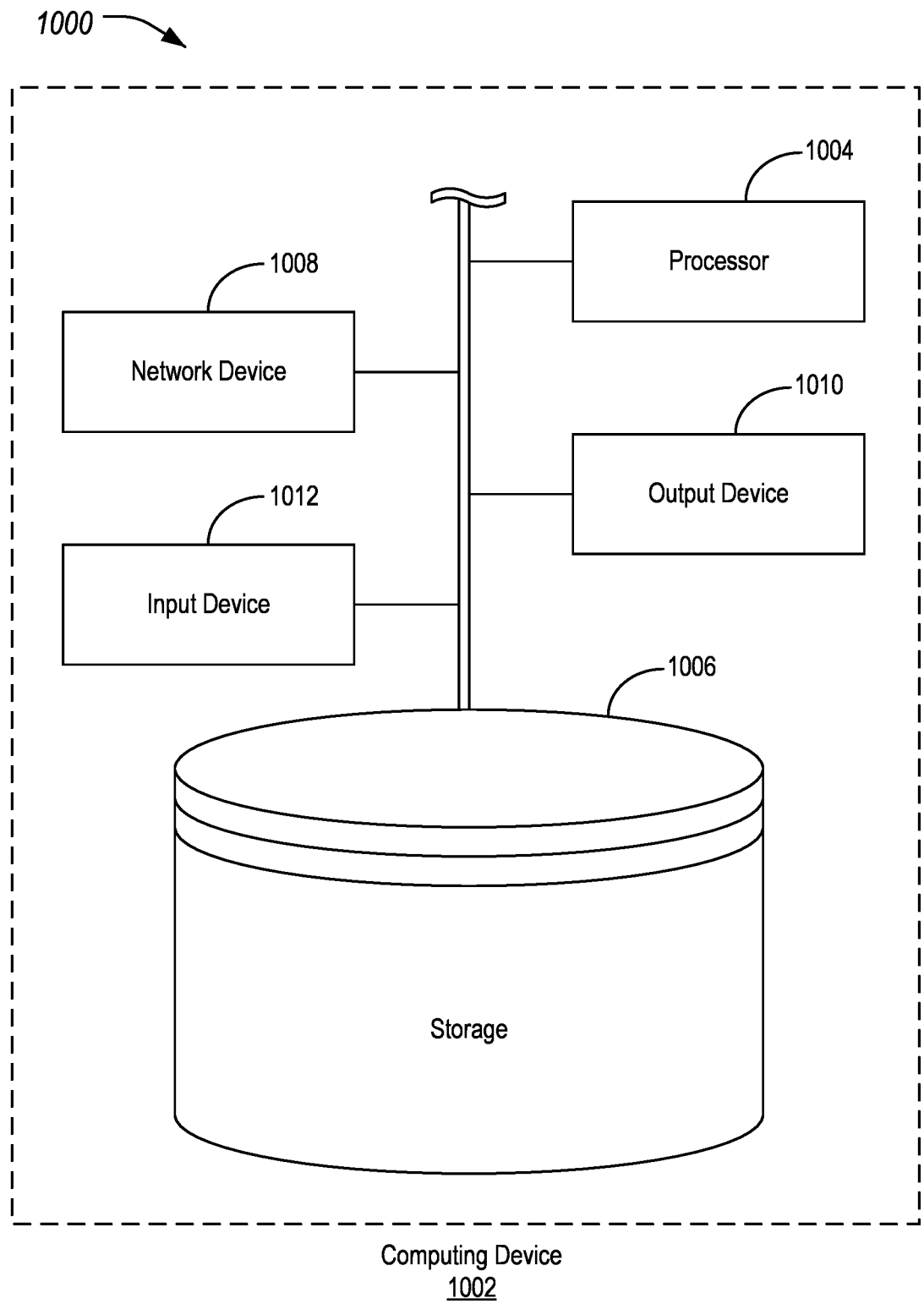
FIG. 10 illustrates an example of a computing device use in the filtering of V2I messages in advance of security verification or other processing of messages.

FIG. 10 illustrates an example 1000 of a computing device 1002 use in the filtering of V2I messages in advance of security verification or other processing of messages. Referring to FIG. 10, and with reference to FIGS. 1-9, the OBU 104, RSU 112, cloud server 116, and traffic signal controller 118 may be examples of such computing devices 1002. As shown, the computing device 1002 may include a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may optionally include other components such as, for example, the storage 1006 and the network device 1008 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100A-B.

The GPU may include hardware and software for display of at least two-dimensional (2D) and optionally three-dimensional (3D) graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raiseable device that may, in an example, be configured to display braille or another physical output that may be touched to provide information to a user.

The input device 1012 may include any of various devices that enable the computing device 1002 to receive control input from users. Examples of suitable input devices 1012 that receive human interface inputs may include keyboards, mice, trackballs, touchscreens, voice microphones, graphics tablets, and the like.

The network devices 1008 may each include any of various devices that enable the OBU 104, RSU 112, and/or traffic signal controller 118, to send and/or receive data from external devices over networks (such as the communications network 110). Examples of suitable network devices 1008 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for performing filtering of infrastructure-to-vehicle (I2V) messages, comprising:
   a transceiver; and
   an on-board unit (OBU), programmed to:
   receive first messages from one or more road-side units (RSUs),
   verify the first messages are valid before utilizing a check-in location indicated by the first messages, the verify including to identify a current position and/or heading of the vehicle, and to ensure that the first messages are a match to the check-in location before performing security verification of the first messages,
   responsive to the vehicle approaching the check-in location indicated by the first messages, store a check-in location identifier for the check-in location retrieved from the first messages as being a current check-in location for the vehicle,
   responsive to the vehicle exiting a check-out location indicated by the first messages, removing the check-in location identifier from storage to reset the current check-in location,
   forward the first messages matching the current check-in location to a vehicle application for processing,
   receive second messages from the one or more RSUs,
   verify the second messages are valid before forwarding the second messages to the vehicle application the second verify including to identify the current position and/or heading of the vehicle, and to ensure that the second messages are a match to the check-in location before performing security verification of the second messages,
   responsive to a message identifier in the second messages matching the check-in location identifier, forward the second messages to a vehicle application for processing, and
   otherwise discard the second messages.

2. The vehicle of claim 1, wherein the OBU is further programmed to verify the first messages using Wireless Access in Vehicular Environments (WAVE) protocol as defined by Institute of Electrical and Electronics Engineer (IEEE) 1609.2 WAVE standard.

3. The vehicle of claim 1, wherein the OBU is further programmed to verify the second messages using WAVE protocol as defined by IEEE 1609.2 WAVE standard.

4. The vehicle of claim 1, wherein the first messages are MAP messages, and the second messages are signal status message (SSM) messages.

5. The vehicle of claim 1, wherein the first messages are toll access message (TAM) messages, and the second messages are toll usage message acknowledgement (TUMAck) messages.

6. A method for performing filtering of I2V messages by a vehicle, comprising:
   receiving first messages from one or more road-side units (RSUs);
   verifying the first messages are valid before utilizing a check-in location indicated by the first messages, the verify including to identify a current position and/or heading of the vehicle, and to ensure that the first messages are a match to the check-in location before performing security verification of the first messages;
   responsive to the vehicle approaching the check-in location indicated by the first messages, storing a check-in location identifier for the check-in location retrieved from the first messages as being a current check-in location for the vehicle;
   responsive to the vehicle exiting a check-out location indicated by the first messages, removing the check-in location identifier from storage to reset the current check-in location;
   forwarding the first messages matching the current check-in location to a vehicle application for processing;
   receiving second messages from the one or more RSUs;
   verifying the second messages are valid before forwarding the second messages to the vehicle application the second verify including to identify the current position and/or heading of the vehicle, and to ensure that the second messages are a match to the check-in location before performing security verification of the second messages:
   responsive to a message identifier in the second messages matching the check-in location identifier, forwarding the second messages to a vehicle application for processing; and
   otherwise discarding the second messages.

7. The method of claim 6, further comprising verifying the first messages using Wireless Access in Vehicular Environments (WAVE) protocol as defined by Institute of Electrical and Electronics Engineer (IEEE) 1609.2 WAVE standard.

8. The method of claim 6, further comprising verifying the second messages using WAVE protocol as defined by IEEE 1609.2 WAVE standard.

9. The method of claim 6, wherein one of:
   the first messages are MAP messages, and the second messages are signal status message (SSM) messages; or
   the first messages are toll access message (TAM) messages, and the second messages are toll usage message acknowledgement (TUMack) messages.

10. A non-transitory computer-readable medium comprising instructions for performing filtering of I2V messages that, when executed by an OBU of a vehicle, cause the OBU to perform operations including to:
    receive first messages from one or more road-side units (RSUs);
    verify the first messages are valid before utilizing a check-in location indicated by the first messages, the verify including to identify a current position and/or heading of the vehicle, and to ensure that the first messages are a match to the check-in location before performing security verification of the first messages;

responsive to the vehicle approaching the check-in location indicated by the first messages, store a check-in location identifier for the check-in location retrieved from the first messages as being a current check-in location for the vehicle;

responsive to the vehicle exiting a check-out location indicated by the first messages, removing the check-in location identifier from storage to reset the current check-in location;

forward the first messages matching the current check-in location to a vehicle application for processing;

receive second messages from the one or more RSUs;

verify the second messages are valid before forwarding the second messages to the vehicle application the second verify including to identify the current position and/or heading of the vehicle, and to ensure that the second messages are a match to the check-in location before performing security verification of the second messages;

responsive to a message identifier in the second messages matching the check-in location identifier, forward the second messages to the vehicle application for processing; and otherwise discard the second messages.

11. The non-transitory computer-readable medium of claim 10, wherein one of:

the first messages are MAP messages, and the second messages are signal status message (SSM) messages; or the first messages are toll access message (TAM) messages, and the second messages are toll usage message acknowledgement (TUMAck) messages.

* * * * *